(12) United States Patent
Shimizu

(10) Patent No.: US 7,380,622 B2
(45) Date of Patent: Jun. 3, 2008

(54) SMALL-SIZED VEHICLE

(75) Inventor: Katsuhisa Shimizu, Shizuoka (JP)

(73) Assignee: Yamaha Hatsukoki Kabushiki Kaisha, Shizuoka (JP)

( * ) Notice: Subject to any disclaimer, the term of this patent is extended or adjusted under 35 U.S.C. 154(b) by 387 days.

(21) Appl. No.: 10/975,550

(22) Filed: Oct. 28, 2004

(65) Prior Publication Data

US 2005/0257990 A1 Nov. 24, 2005

Related U.S. Application Data

(60) Provisional application No. 60/573,414, filed on May 24, 2004.

(51) Int. Cl.
*B60K 13/02* (2006.01)
(52) U.S. Cl. .................................... 180/68.1; 180/444

(58) Field of Classification Search ............... 180/68.1, 180/68.4, 444
See application file for complete search history.

(56) References Cited

U.S. PATENT DOCUMENTS

| | | | | |
|---|---|---|---|---|
| 5,887,671 | A * | 3/1999 | Yuki et al. ................. | 180/68.1 |
| 6,035,955 | A * | 3/2000 | Suzuki et al. .............. | 180/68.1 |
| 6,988,573 | B2 * | 1/2006 | Tsuruta et al. ............. | 180/68.1 |
| 2004/0226764 | A1 * | 11/2004 | Iwasaki et al. ............. | 180/68.1 |
| 2005/0257972 | A1 * | 11/2005 | Iwami et al. ............... | 180/68.1 |

* cited by examiner

*Primary Examiner*—Tony H. Winner
(74) *Attorney, Agent, or Firm*—Keating & Bennett, LLP

(57) ABSTRACT

A small-sized vehicle is capable of cooling an electric motor of a power steering apparatus that supplies a steering shaft with an assisting steering force. The electric motor is arranged so as to receive cooling air from a cooling fan disposed on the rear side of a radiator that cools the engine cooling water with outside air.

17 Claims, 5 Drawing Sheets

SMALL-SIZED VEHICLE

Applicant(s) claim(s) benefit under 35 U.S.C. § 119(e) of U.S. provisional application No. 60/573,414 filed May 24, 2004.

BACKGROUND OF THE INVENTION

1. Field of the Invention

The present invention relates to, for example, a small-sized vehicle such as a saddle type three-wheel or four-wheel vehicle used for farming, an ATV (All Terrain Vehicle) for sportive traveling off-road, a golf cart, and other small-sized vehicles. More specifically, the present invention relates to a small-sized vehicle having an electric motor-driven power steering apparatus.

2. Description of the Related Art

Generally, a small-sized vehicle used for traveling off-road has the following structure. Front and rear wheels each having a balloon tire with low pressure and wide diameter are disposed at the front and rear of a vehicle body frame, and an engine unit is mounted between the front and rear wheels. Further, a steering shaft is arranged between the left and right front wheels, and a wheel-type steering handle or a bar-type steering handle is attached to the upper end of the steering shaft. A small-sized vehicle of this type can travel off-road at will by turning the steering handle from side to side.

In recent years, some users expect further operational improvements when maneuvering the small-sized vehicle so as to reduce a load on operating the steering handle.

Accordingly, an electric motor-driven power steering apparatus which is connected to a steering shaft to thereby supply the steering shaft with an assisting steering force from the electric motor has been suggested.

In the power steering apparatus, under steering operations, the electric motor always operates and generates heat. When traveling at high speeds, a steering angle or a steering speed is rarely increased, such that the amount of heat generated by the electric motor is relatively small. In addition, when traveling at high speeds, the electric motor is cooled by moving air, and thus, requires less cooling. In contrast, when traveling at low speeds, the steering speed and angle are often increased. In that case, the amount of heat generated is increased, and the amount of cooling provided by the moving air is decreased. Accordingly, the electric motor requires increased cooling when traveling at low speeds.

SUMMARY OF THE INVENTION

To overcome the problems described above, preferred embodiments of the present invention provide a small-sized vehicle having an electric motor-driven power steering apparatus, which is capable of sufficiently cooling the electric motor even when traveling at low speeds.

According to preferred embodiments of the present invention, when a small-sized vehicle includes an electric motor-driven power steering apparatus for supplying a steering shaft with an assisting steering force and a radiator for cooling engine cooling water with outside air, an electric motor is arranged so as to receive cooling air from a cooling fan disposed on the rear side of the radiator.

According to preferred embodiments of the present invention, the electric motor of the power steering apparatus is arranged at a location to receive the cooling air from the cooling fan disposed on the rear side of the radiator. Accordingly, even when traveling at low speeds, the electric motor is sufficiently cooled.

Note that the temperature of the cooling air that passes through the radiator is increased to a temperature that is higher than the outside temperature due to heat from the engine cooling water. Nevertheless, the temperature of the cooling air that passes through the radiator is much lower than the temperature of the electric motor in operation. Therefore, with the cooling air that passes through the radiator, the electric motor is sufficiently cooled.

According to one preferred embodiment of the present invention, the electric motor is disposed toward one side in the vehicle width direction from the center line of the vehicle in the vehicle width direction, and the cooling fan is disposed toward one side in the vehicle width direction corresponding to the location of the electric motor. The electric motor is disposed between the left oblique rear position and the right oblique rear position of the steering shaft so as to be spaced from the steering shaft, and the cooling fan is disposed in front of the electric motor.

In this preferred embodiment, the electric motor and the cooling fan are arranged at substantially the same location in the vehicle width direction. Accordingly, the electric motor receives the cooling air from the cooling fan so as to be sufficiently cooled.

According to another preferred embodiment of the present invention, an air shroud for guiding the air that passes through the radiator rearward is arranged on the rear side of the radiator, the cooling fan is arranged in the air shroud, and the electric motor is arranged at a location that is in an airflow path from a rear-end opening of the air shroud. The electric motor is disposed toward one side in the vehicle width direction from the center of the vehicle in the vehicle width direction, and the center of the rear-end opening of the air shroud is disposed toward one side in the vehicle width direction from the center of a front-end opening in the vehicle width direction so as to be substantially aligned with the electric motor.

In this preferred embodiment, the cooling air that passes through the radiator is guided to the electric motor by the air shroud, to ensure cooling of the electric motor.

According to still another preferred embodiment of the present invention, a flow direction of the airflow from the air shroud substantially coincides with the center line of the vehicle in the vehicle width direction or crosses the center line of the vehicle.

In this preferred embodiment, by arranging the electric motor along a line of the flow direction of the airflow, the airflow from the air shroud is guided to the electric motor, such that the electric motor is sufficiently cooled.

According to still another preferred embodiment of the present invention, the area of the rear-end opening of the air shroud is preferably designed to be smaller than the area of the front-end opening of the air shroud.

In this preferred embodiment, the velocity of the airflow from the air shroud increases, such that the cooling of the electric motor is further ensured.

According to preferred embodiments of the present invention, when a small-sized vehicle includes a power steering apparatus for supplying a steering shaft with an assisting steering force, an electric motor of the power steering apparatus is arranged between the left oblique rear position and the right oblique rear position of the steering shaft so as to be spaced from the steering shaft, and not directly behind the steering shaft.

According to preferred embodiments of the present invention, the electric motor of the power steering apparatus is arranged between the left oblique rear position to the right oblique rear position of the steering shaft so as to be spaced from the steering shaft, that is, at locations other than directly behind the steering shaft. Accordingly, the steering shaft location does not disturb the airflow from the radiator, such that the cooling performance for the electric motor is not inhibited by the steering shaft.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Figure 1:
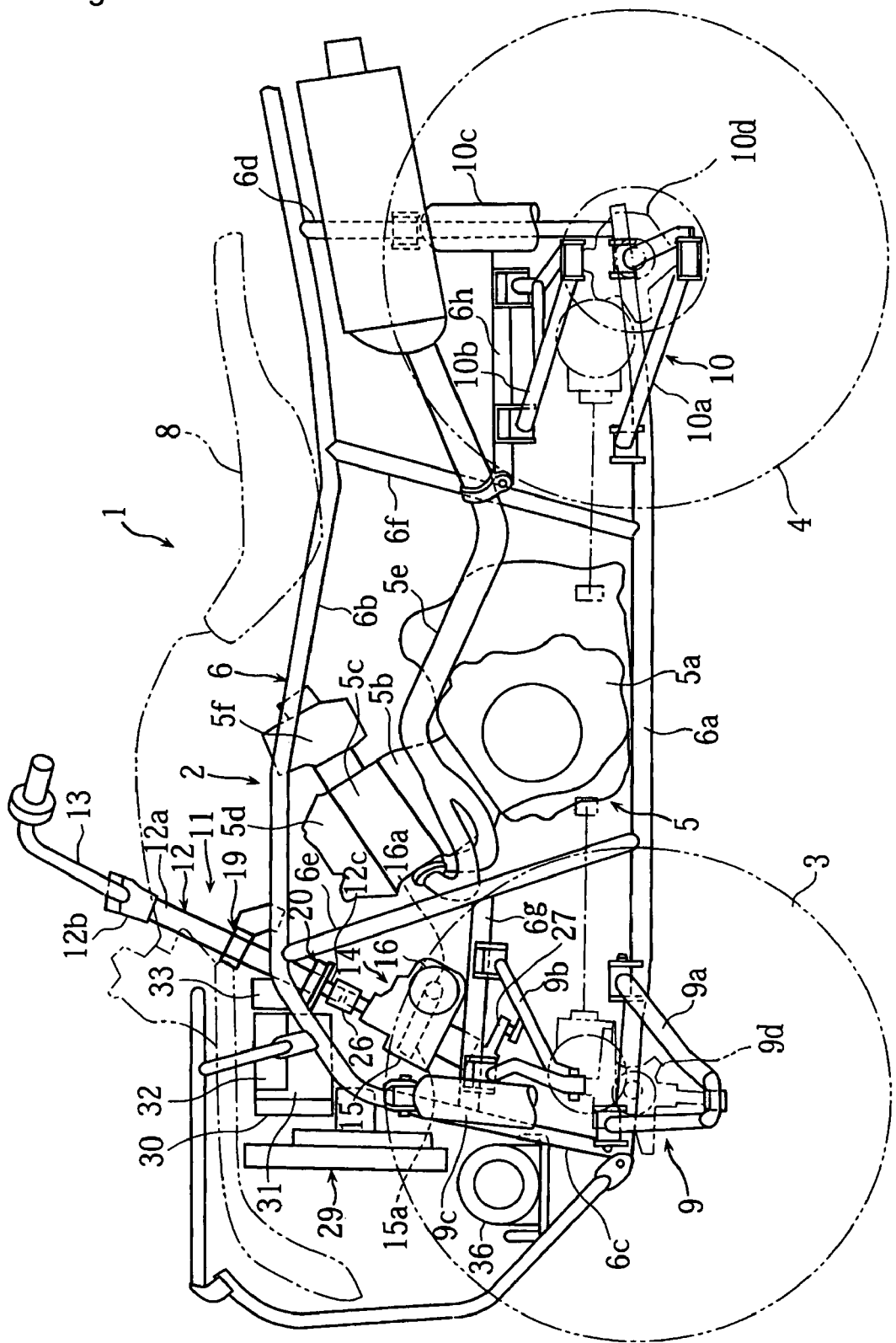
FIG. 1 is a left side view of a small-sized vehicle for traveling off-road according to a first preferred embodiment of the present invention, in which some components are shown by solid lines, and some components are shown by chain-double dashed lines and dotted lines.
Figure 2:
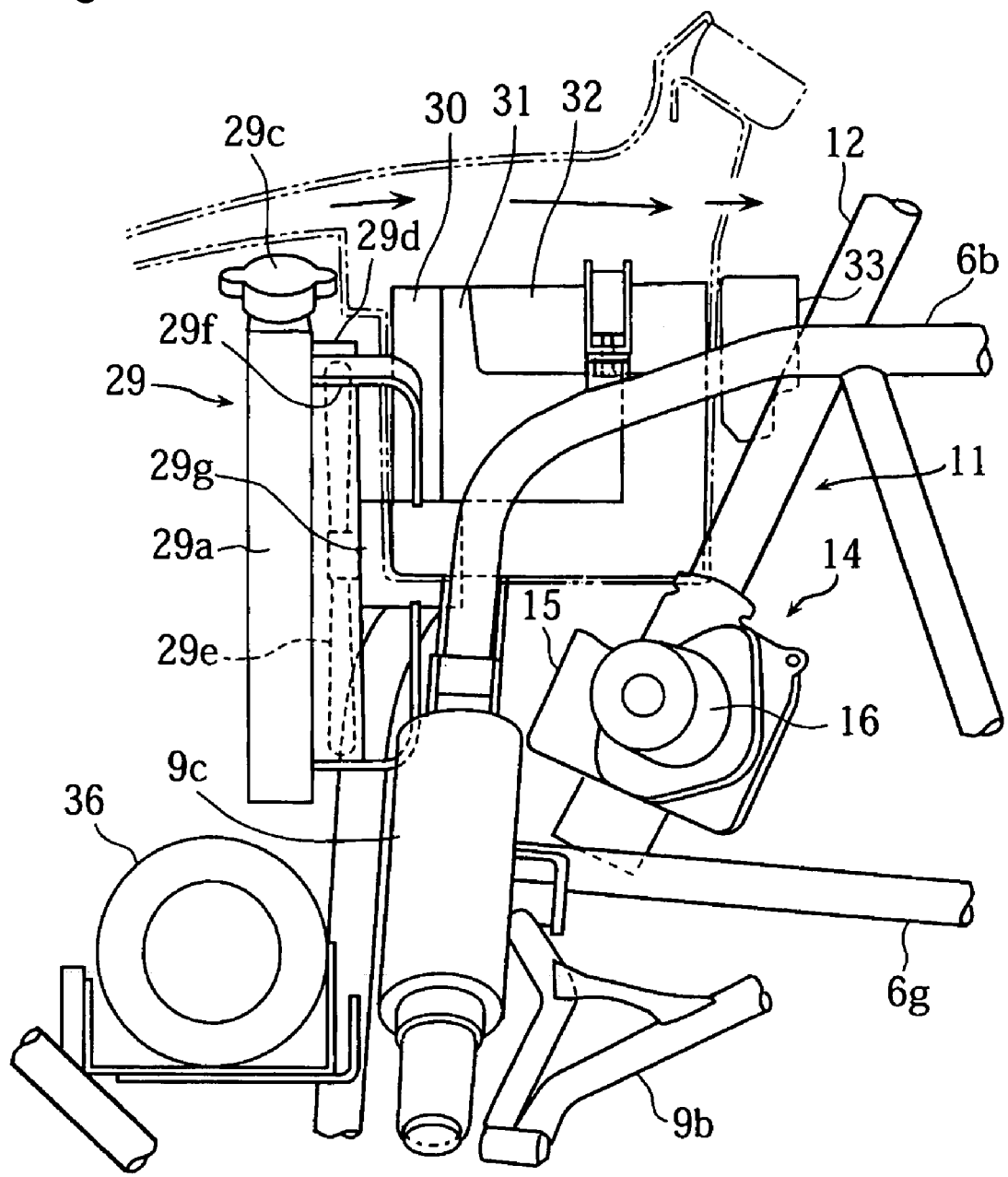
FIG. 2 is a left side view of the front portion of the small-sized vehicle according to the first preferred embodiment, in which the structural arrangement between vehicle components such as a radiator, an electric motor, a battery, and other components is shown.
Figure 3:
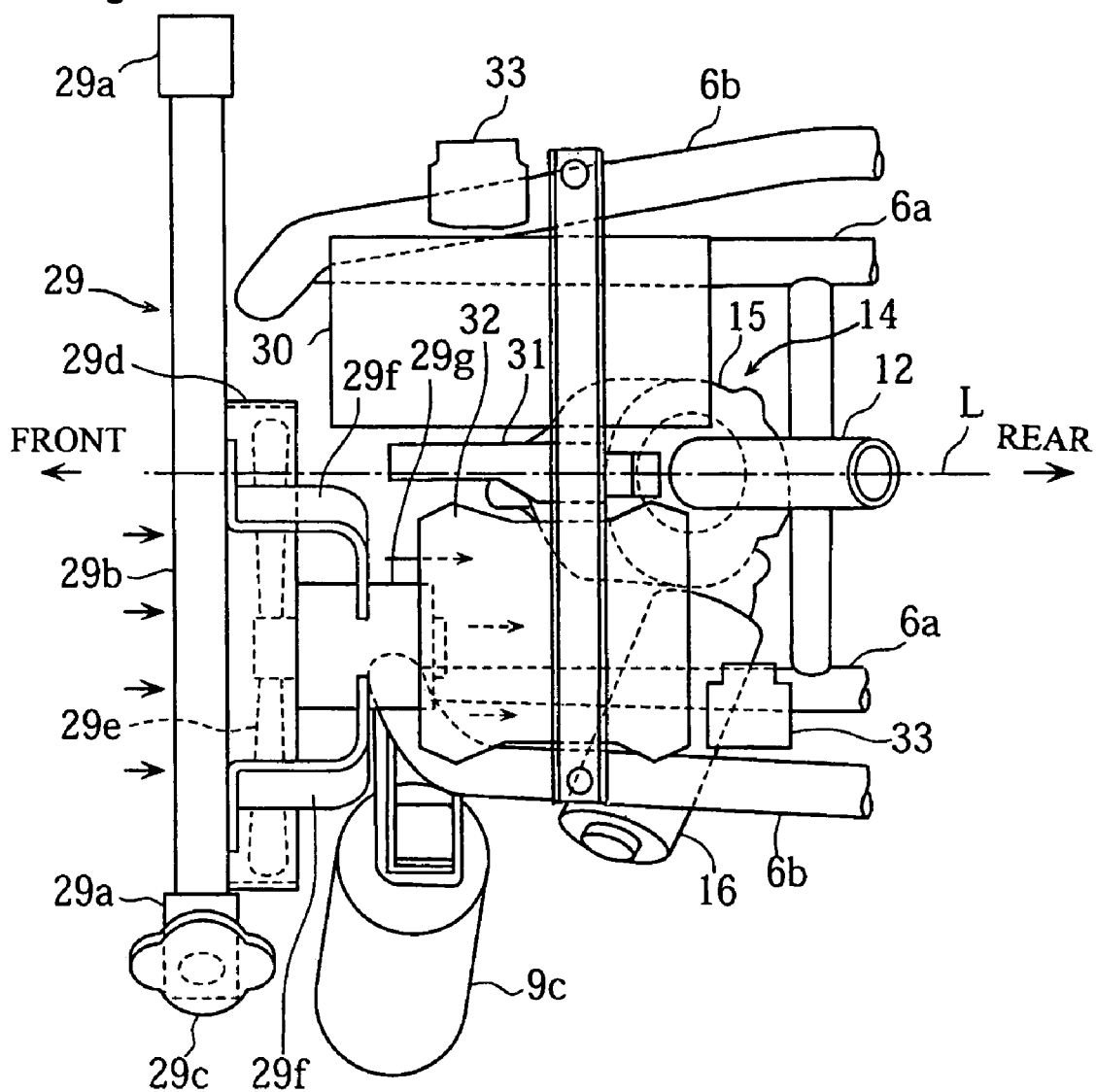
FIG. 3 is a plan view of the front portion of the small-sized vehicle according to the first preferred embodiment, in which the structural arrangement between the vehicle components such as the radiator, the electric motor, the battery, and other components are shown.

Hereinafter, preferred embodiments according to the present invention will be described with reference to the attached drawings. Note that the indications of front, rear, left, and right in the description of these embodiments represent the front, rear, left, and right from an operator in a seated on a seat of the small-sized vehicle.

In FIG. 1 to FIG. 4, "1" denotes a small-sized vehicle for traveling off-road. This small-sized vehicle 1 includes a vehicle body frame 2, left and right front wheels 3, 3 disposed at left and right front portions of the vehicle body frame 2, left and right rear wheels 4, 4 disposed at left and right rear portions of the vehicle body frame 2, an engine unit 5 mounted between the front wheels 3, 3 and the rear wheels 4, 4 of the vehicle body frame 2, and a steering system 11 disposed between the left and right front wheels 3, 3.

The vehicle body frame 2 is a double cradle type frame in which left and right side frames 6, 6 are connected by a plurality of cross pipes. Each of the side frames 6 has a lower pipe 6a arranged approximately at a height of the axes of the front and rear wheels 3, 4 and extending in a front to rear direction, and an upper pipe 6b arranged approximately at a height of the lower portion of a saddle type seat 8 and extending in the front to rear direction. At the front end portion of the upper pipe 6b, a front-end vertical pipe 6c is formed by bending the upper pipe 6b so as to extend downward. The lower end portion of the front-end vertical pipe 6c is connected to the front end portion of the lower pipe 6a. Further, the lower pipe 6a and the upper pipe 6b are connected with each other by a rear-end vertical pipe 6d, and intermediate vertical pipes 6e, 6f on the front and rear sides, respectively. Furthermore, the front-end vertical pipe 6c and the intermediate vertical pipe 6e on the front side, and the rear-end vertical pipe 6d and the intermediate vertical pipe 6f on the rear side are coupled to each other by intermediate horizontal pipes 6g, 6h arranged in parallel with the lower pipe 6a, respectively.

The engine unit 5 is mounted in the space surrounded by the lower and upper pipes 6a, 6b, and the front and rear intermediate vertical pipes 6e, 6f. In front of an engine case 5a having a built-in crankshaft of the engine unit 5 and a built-in variable speed gear, a cylinder block 5b, a cylinder head 5c, and a head cover 5d are stacked and fastened. Further, an exhaust unit 5e is connected to the front wall of the cylinder head 5c. The exhaust unit 5e extends rearward at a height of the cylinder block 5b. Further, a carburetor 5f is connected to the rear wall of the cylinder head 5c.

The left and right front wheels 3, 3 are supported by a double wishbone type front-wheel suspension system 9 in a vertically swingable and horizontally steerable manner. The front-wheel suspension system 9 includes a lower arm 9a supported by the front portion of the lower pipe 6a in a vertically swingable manner, an upper arm 9b supported by the intermediate horizontal pipe 6g on the front side in a vertically swingable manner, and a cushion unit 9c disposed between the front-end vertical pipe 6c and the lower arm 9a.

Also, the left and right rear wheels 4, 4 are supported by a double wishbone type rear-wheel suspension system 10 in a vertically swingable manner. The rear-wheel suspension system 10 includes a lower arm 10a supported by the rear portion of the lower pipe 6a in a vertically swingable manner, an upper arm 10b supported by the intermediate horizontal pipe 6h on the rear side in a vertically swingable manner, and a cushion unit 10c disposed between the rear-end vertical pipe 6d and the lower arm 10a.

Between tip portions of the lower arm 9a and the upper arm 9b, a knuckle 9d for the front wheel 3 is coupled to the lower arm 9a and the upper arm 9b via a ball joint so as to support the front wheel 3 in a rotatable. manner. Similarly, between the lower arm 10a and the upper arm 10b, a knuckle 10d for the rear wheel is coupled to the lower arm 10a and the upper arm 10b in an axially rotatable manner so as to support the rear wheel 4 in a rotatable manner.

In front of the steering system 11, a winch 36 is provided, and above the winch 36, a radiator 29 is provided for cooling the cooling water of the engine unit 5. Further, between the radiator 29 and the steering system 11, various vehicle components are provided, such as a battery 30, a control unit 31 for the engine unit 5, a control unit 32 for a power steering apparatus which will be described later, a relay 33, and other suitable components. Incidentally, the winch 36 includes a wire cable that is wound around a drum that is driven to rotate by a motor, and the winch 36 is used, for example, to extricate the small-sized vehicle if the small-sized vehicle gets stuck in a swamp.

The radiator 29 has a substantially tabular shape and includes a pair of left and right side tanks 29a, 29a that extend vertically, and an element 29b arranged between the side tanks 29a, 29a and which functions as a heat exchanger. On the rear surface side of the element 29b, a fan case 29d is provided having an opening at its rear end and arranged toward the left side in the vehicle width direction. The fan case 29d is configured to cover substantially the left half of the element 29b and includes a cooling fan 29e disposed therein. A fan motor 29g which drives the cooling fan 29e projects rearward from the fan case 29d. Incidentally, a bracket for fixedly supporting the fan motor 29g to the rear surface side of the-element 29b is denoted by "29f", and "29c" is a cap for an opening from which the cooling water is supplied into the side tank 29a.

Here, the radiator 29 is mounted in the vehicle body frame 2 such that a center line in the vehicle width direction of the radiator 29 and a center line L of the vehicle in the vehicle width direction coincide with each other. Accordingly, the cooling fan 29e is disposed toward the left side from the center line L of the vehicle.

The steering system 11 includes a steering shaft 12 arranged substantially at the center of the front wheels 3, 3, a steering handle 13 attached to the upper end of the steering shaft 12, and an electric motor-driven power steering apparatus 14 connected to the lower end of the steering shaft 12. The lower end portion of the steering shaft 12 and an input shaft of the power steering apparatus 14 are connected by a connecting pipe 26 to form a substantially straight line. Further, the steering shaft 12 is arranged so as to be tilted rearward.

The steering shaft 12 has a cylindrical column portion 12a, a bracket 12b for mounting a handle which is fixed to the upper end portion of the cylindrical column portion 12a and to which the steering handle 13 is mounted in a detachable manner, and a coupling shaft portion 12c coaxially fixed at the lower end portion thereof.

The coupling shaft portion 12c is axially supported by the vehicle body frame 2 via a lower bearing 20, and the column portion 12a is axially supported by the vehicle body frame 2 via an upper bearing 19 at a substantially the center of the column portion 12a in the axial direction thereof.

The power steering apparatus 14 includes a reduction gear 15, and an electric motor 16 integrally fixed to a gear case of the reduction gear 15. A worm 16a attached to an output shaft of the electric motor 16 is engaged with a worm wheel 15a in the reduction gear 15. A lower projection of the output shaft of the reduction gear 15 is coupled to the knuckle 9d for the left and right front wheels via a pitman arm 27 and a tie rod (not shown). Incidentally, the reduction gear 15 is disposed above the left and right intermediate horizontal pipes 6g, 6g of the vehicle body frame 2.

Figure 4:
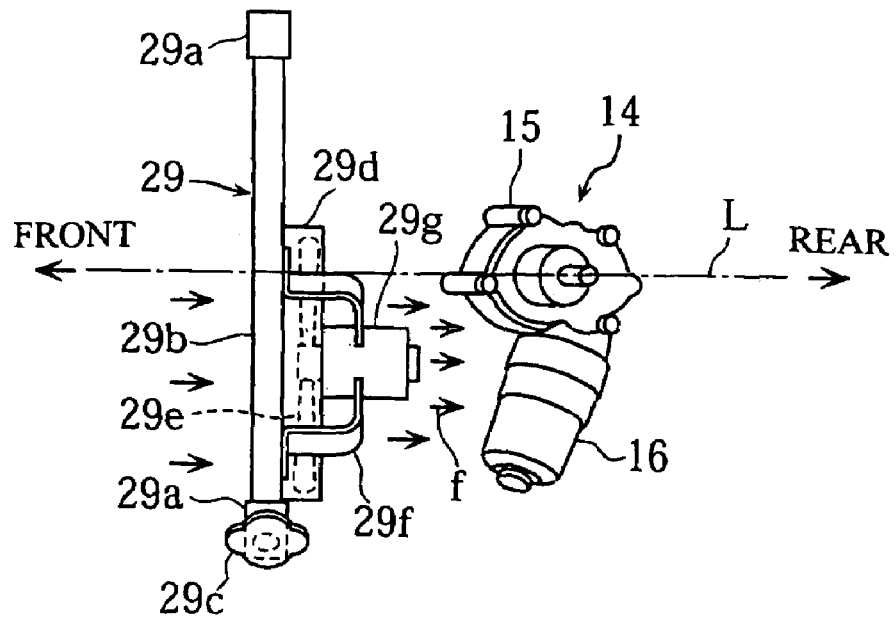
FIG. 4 is a plan view showing the structural arrangement between the radiator and the electric motor of the small-sized vehicle according to the first preferred embodiment of the present invention.

Here, the worm 16a attached to the output shaft of the electric motor 16 is engaged with the worm wheel 15a in the reduction gear 15 at the rear side portion on the steering shaft 12. Specifically, the engaged portion is substantially aligned with the center line L of the vehicle. While the electric motor 16 extends leftward from the center line L of the vehicle in the vehicle width direction. As a result, as shown in FIG. 4, the electric motor 16 is arranged directly behind the cooling fan 29e, that is, at a location that is exposed to the cooling air "f" from the cooling fan 29e.

In this first preferred embodiment, the electric motor 16 of the power steering apparatus 14 is disposed leftward in the vehicle width direction from the center line L of the vehicle in the vehicle width direction, and the cooling fan 29e is disposed toward the same side as of the electric motor 16. Specifically, the electric motor 16 is arranged directly behind the cooling fan 29e disposed on the rear side of the radiator 29. Accordingly, even when traveling at low speeds, the electric motor 16 receives the cooling air from the cooling fan 29e, such that the electric motor 16 is sufficiently cooled.

Figure 7:
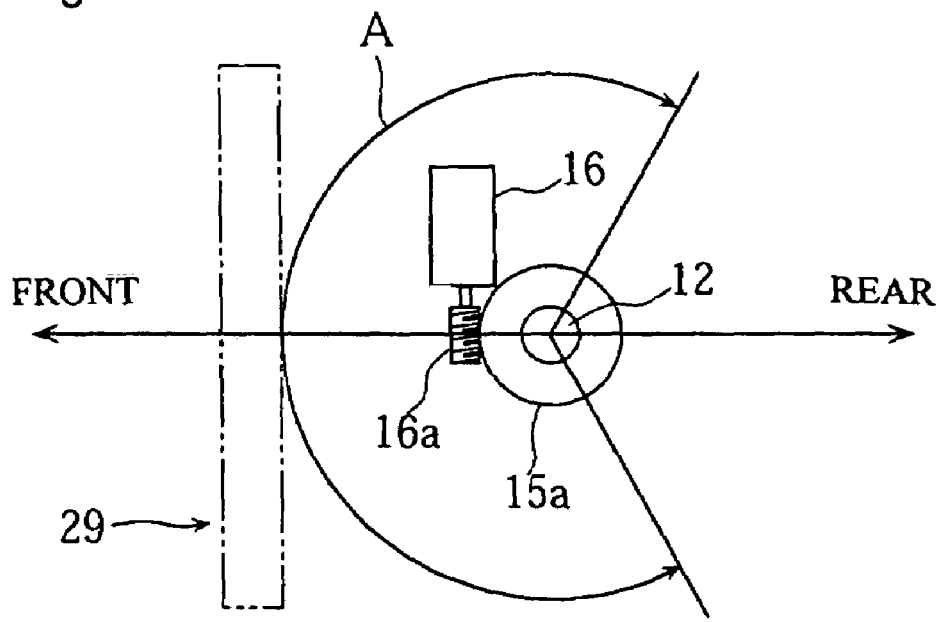
FIG. 7 is a schematic plan view illustrating an applicable arrangement area for the electric motor according to preferred embodiments of the present invention.

Here, in a preferred embodiment of the present invention, as shown in FIG. 7, it is possible to arrange the electric motor 16 within the range from the left oblique rear position to the right oblique rear position of the steering shaft 12 so as to be spaced from the steering shaft 12 as shown by an arrow A, that is, other than a portion directly behind the steering shaft 12.

Thus, when the electric motor 16 of the power steering apparatus 14 is arranged within the range shown by the arrow A, that is, other than the portion directly behind the steering shaft 12, the electric motor 16 receives the cooling air from the cooling fan without disturbances by the steering shaft 12, in other words, the cooling performance for the electric motor 16 is not inhibited by the steering shaft 12.

Such a structure in which the electric motor 16 is arranged within the range other than directly behind the steering shaft 12 is also applicable to a case in which no radiator is provided. When configured in such a manner, the electric motor 16 receives the moving air without disturbances by the steering shaft 12, that is, the cooling performance for the electric motor 16 is not inhibited by the steering shaft 12.

Figure 5:
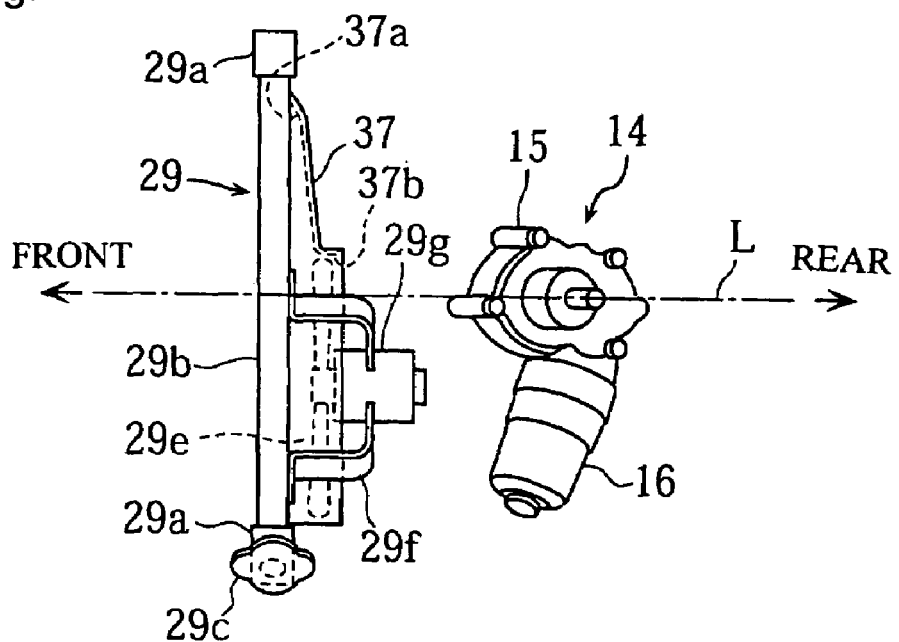
FIG. 5 is a plan view showing the structural arrangement between a radiator and an electric motor of a small-sized vehicle according to a second preferred embodiment of the present invention.

FIG. 5 is a plan view illustrating a structural arrangement of an electric motor and a radiator according to a second preferred embodiment of the present invention. In this second preferred embodiment, an air shroud 37 is provided on the rear side of a radiator 29 for guiding the air that passes through the radiator 29 rearward.

The air shroud 37 is configured such that a front-end opening 37a has a larger area than a rear-end opening 37b. Specifically, the front-end opening 37a is designed to cover substantially all of the element 29b, while the rear-end opening 37b is designed to cover substantially the left half of the element 29b. The center of the rear-end opening 37b of the air shroud 37 is arranged so as to be displaced leftward in the vehicle width direction from the center of the front-end opening 37a in the vehicle width direction.

The cooling fan 29e is disposed toward the side of the rear-end opening 37b in the air shroud 37. Further, the electric motor 16 is arranged in the airflow from the rear-end opening 37b of the air shroud 37.

Also, in this second preferred embodiment, the cooling air that passes through the radiator 29 flows from the rear-end opening 37b of the air shroud 37 substantially in parallel with the center line L of the vehicle. Therefore, the cooling air from the air shroud 37 is guided to the electric motor 16, such that the electric motor 16 is sufficiently cooled.

Further, in this second preferred embodiment, the rear-end opening 37b of the air shroud 37 is narrowed, such that the velocity of the airflow from the air shroud 37 increases to thereby cool the electric motor 16 more efficiently.

Figure 6:
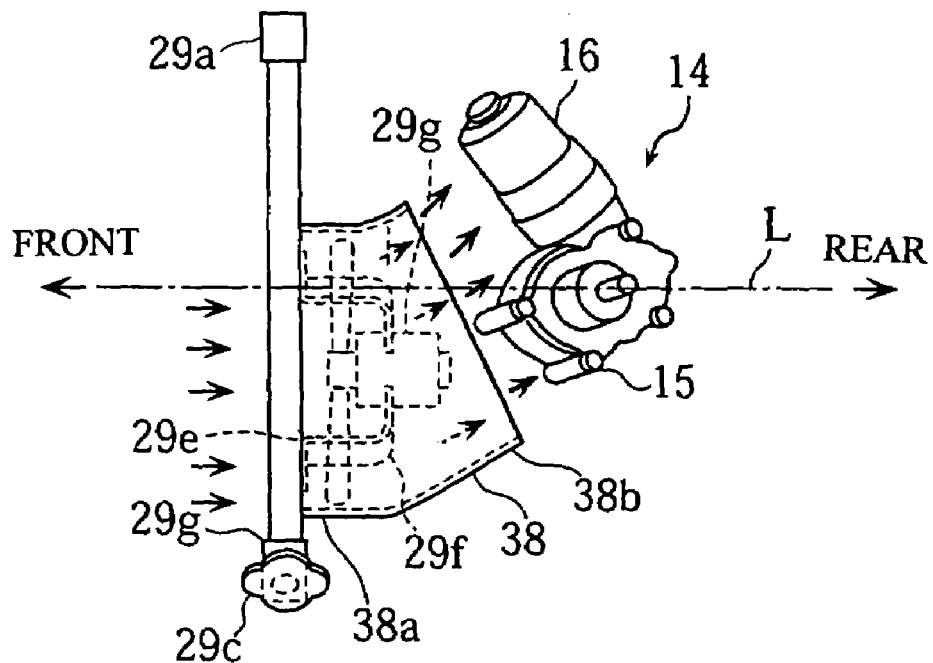
FIG. 6 is a plan view showing the structural arrangement between a radiator and an electric motor of a small-sized vehicle according to a third preferred embodiment of the present invention.

FIG. 6 is a plan view illustrating a structural arrangement of an electric motor and a radiator according to a third preferred embodiment of the present invention. In this third preferred embodiment, an air shroud 38 is provided on the rear side of a radiator 29 for guiding air that passes through the radiator 29 rearward.

In this third preferred embodiment, the cooling fan 29e is arranged so as to be displaced leftward of the center line in the width direction of the vehicle, while the electric motor 16 is arranged so as to be displaced rightward of the center line in the width direction of the vehicle. The air shroud 38 preferably has a substantially cylindrical shape (duct shape), the front portion 38a thereof surrounds the cooling fan 29e, and the rear portion 38b thereof is configured to bend rightward toward the electric motor 16. Accordingly, the cooling air that passes through the radiator 29 is guided by the air shroud 38 to be applied to the electric motor 16. As a result, the electric motor 16 is sufficiently cooled even though it is located on the opposite side of the cooling fan 29e.

The present invention may be embodied in other specific forms without departing from the spirit or essential characteristics thereof.

The present preferred embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A vehicle comprising:
   a vehicle body frame;
   a steering shaft supported by said vehicle body frame in a steerable manner for transmitting a steering force applied to a steering handle attached to an upper end of the steering shaft to a wheel;
   a power steering apparatus supplying said steering shaft with an assisting steering force and including an electric motor; and
   a radiator for cooling engine cooling water with outside air and including a cooling fan disposed on a rear side of said radiator; wherein
   said electric motor of said power steering apparatus is arranged such that the electric motor receives cooling air from said cooling fan disposed on the rear side of said radiator; and
   the electric motor is arranged downstream from the cooling fan in a direction of flow of the cooling air from the cooling fan.

2. The vehicle according to claim 1, wherein the electric motor is arranged so as to be displaced toward one side in a vehicle width direction from a center line of the vehicle in the vehicle width direction, and the cooling fan is arranged so as to be displaced toward the one side in the vehicle width direction corresponding to the location of the electric motor.

3. The vehicle according to claim 1, wherein an air shroud having a front-end opening and a rear-end opening for guiding the air passed through said radiator rearward is disposed on the rear side of said radiator, the cooling fan is disposed in the air shroud, and the electric motor is disposed in a path of an airflow from the rear-end opening of the air shroud.

4. The vehicle according to claim 3, wherein said air shroud is configured such that a direction of the airflow from the air shroud substantially coincides with the center line of the vehicle in the vehicle width direction.

5. The vehicle according to claim 3, wherein said air shroud is configured such that a direction of the airflow from the air shroud substantially crosses the center line of the vehicle in the vehicle width direction.

6. The vehicle according to claim 3, wherein an area of the rear-end opening of the air shroud is less than an area of the front-end opening of the air shroud.

7. The vehicle according to claim 3, wherein the air shroud has a substantially cylindrical shape, and the rear-end portion of the air shroud is bent toward one side in the vehicle width direction from the center line of the vehicle.

8. The vehicle according to claim 3, wherein the electric motor is arranged so as to be displaced toward one side in the vehicle width direction from the center line of the vehicle in the vehicle width direction, and the center of the rear-end opening of the air shroud is arranged so as to be displaced toward the one side in the vehicle width direction from the center of the front-end opening of the air shroud.

9. The vehicle according to claim 1, wherein the electric motor is disposed within a range from a left oblique rear position to a right oblique rear position of said steering shaft so as not to be disposed behind the steering shaft, and the cooling fan is arranged directly in front of the electric motor.

10. A vehicle comprising:
    a vehicle body frame;
    a radiator arranged to cool engine cooling water with outside air and including a cooling fan disposed on a rear side of said radiator;
    a steering shaft supported by said vehicle body frame in a steerable manner for transmitting a steering force applied to a steering handle attached to the upper end thereof to a wheel to be steered; and
    a power steering apparatus supplying said steering shaft with an assisting steering force including an electric motor; wherein
    said electric motor of said power steering apparatus is arranged within a range from a left oblique rear position to a right oblique rear position of said steering shaft so as not to be located behind said steering shaft;
    said electric motor of said power steering apparatus is arranged such that the electric motor receives cooling air from said cooling fan disposed on the rear side of said radiator; and
    said electric motor is arranged downstream from the cooling fan in a direction of flow of the cooling air from the cooling fan.

11. The vehicle according to claim 10, wherein the electric motor is arranged so as to be displaced toward one side in a vehicle width direction from a center line of the vehicle in the vehicle width direction, and the cooling fan is arranged so as to be displaced toward the one side in the vehicle width direction corresponding to the location of the electric motor.

12. The vehicle according to claim 10, wherein an air shroud having a front-end opening and a rear-end opening for guiding the air passed through said radiator rearward is disposed on the rear side of said radiator, the cooling fan is disposed in the air shroud, and the electric motor is disposed in an airflow from the rear-end opening of the air shroud.

13. The vehicle according to claim 12, wherein the electric motor is arranged so as to be displaced toward one side in the vehicle width direction from the center line of the vehicle in the vehicle width direction, and the center of the rear-end opening of the air shroud is arranged so as to be displaced toward the one side in the vehicle width direction from the center of the front-end opening of the air shroud.

14. The vehicle according to claim 12, wherein said air shroud is configured such that a direction of the airflow from the air shroud substantially coincides with the center line of the vehicle in the vehicle width direction.

15. The vehicle according to claim 12, wherein said air shroud is configured such that a direction of the airflow from the air shroud substantially crosses the center line of the vehicle in the vehicle width direction.

16. The vehicle according to claim 12, wherein an area of the rear-end opening of the air shroud is less than an area of the front-end opening of the air shroud.

17. The vehicle according to claim 12, wherein the air shroud has a substantially cylindrical shape, and the rear-end portion of the air shroud is bent toward one side in the vehicle width direction from the center line of the vehicle.

* * * * *